June 21, 1966   E. HAAS ETAL   3,256,763
DIE CUTTING MACHINE WITH BRACED C FRAME Filed May 18, 1964   2 Sheets-Sheet 1

INVENTORS
EDWARD KOTTSIEPER
EDGAR HAAS
BY
James and Franklin
ATTORNEYS

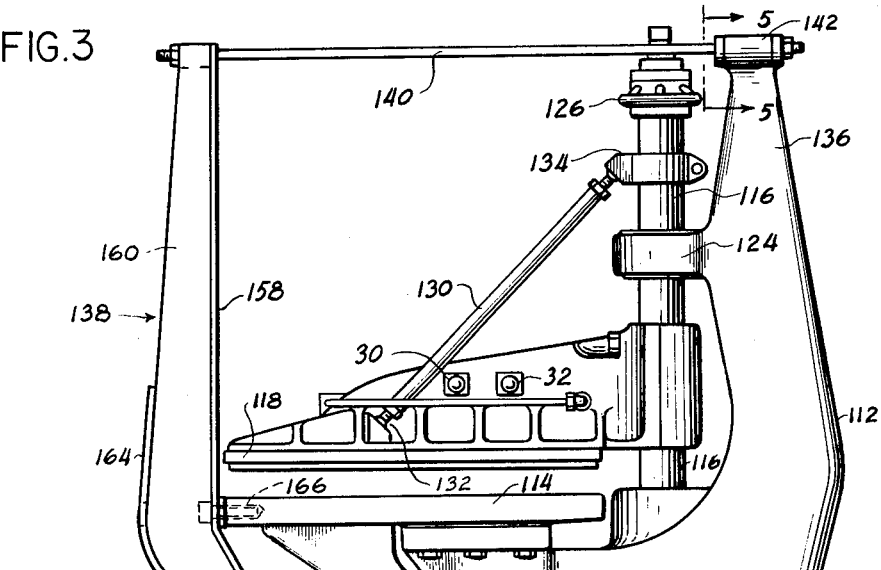

United States Patent Office 3,256,763
Patented June 21, 1966

3,256,763
DIE CUTTING MACHINE WITH
BRACED C FRAME
Edgar Haas, New York, N.Y., and Edward Kottsieper, Fairfield, Conn., assignors to Herman Schwabe, Inc., Brooklyn, N.Y., a corporation of New York
Filed May 18, 1964, Ser. No. 368,160
13 Claims. (Cl. 83—535)

Die cutting machines of the so-called clicker type have been in wide use for many years. A heavy cast C frame supports a table for a cutting block, and an upright cylindrical column or post. The post carries an arm which is horizontally oscillatable toward or away from a position over the table, and the post is vertically reciprocable to give the arm its cutting motion. With material resting on the block the arm is moved aside; a die is placed on the material; the arm is moved back over the die; the machine is operated to force the die through the material; the arm is moved aside; the die is shifted to a new area of material with minimum waste; and so on. The machine was worked with the operator standing at the end of the table and arm, but with the increased use of wider materials in recent years, the table and arm have been lengthened, and the operator then may stand at the side instead of at the end of the machine.

Because of the increased length, a cutting force at the end has increased the tendency to spread or open the C frame. This is particularly true when cutting relatively hard material such as fibreboard, or when using dies which are either intricate or multiple, so that there is a great total length of cutting edge.

The general object of the present invention is to improve die cutting machines of the clicker type. A more particular object is to provide an effective means to brace the C frame against yielding under the described conditions. In some cases, and for the same reasons, the cutting arm has been provided with struts extending diagonally back to a ring or collar on the post above the upper main bearing of the C frame. A further and more specific object of the present invention is to provide means to brace the C frame, as already described, without interfering with the diagonal struts of the cutting arm.

To accomplish the foregoing general objects, and other more specific objects which will hereinafter appear, our invention resides in the die cutting machine, and in the reinforce or brace elements for the C frame thereof, and their relation one to another, as are hereinafter more particularly described in the following specification. The specification is accompanied by drawings in which:

FIG. 3 is a side elevation of another braced die cutting machine, the cutting arm of which has diagonal struts;

FIG. 4 is an elevation of the same;

FIG. 5 is a fragmentary section drawn to larger scale and taken approximately on the line 5—5 of FIG. 3; and FIG. 6 is a fragmentary section drawn to enlarged scale and taken approximately on the line 6—6 of FIG. 4.

Figure 1:
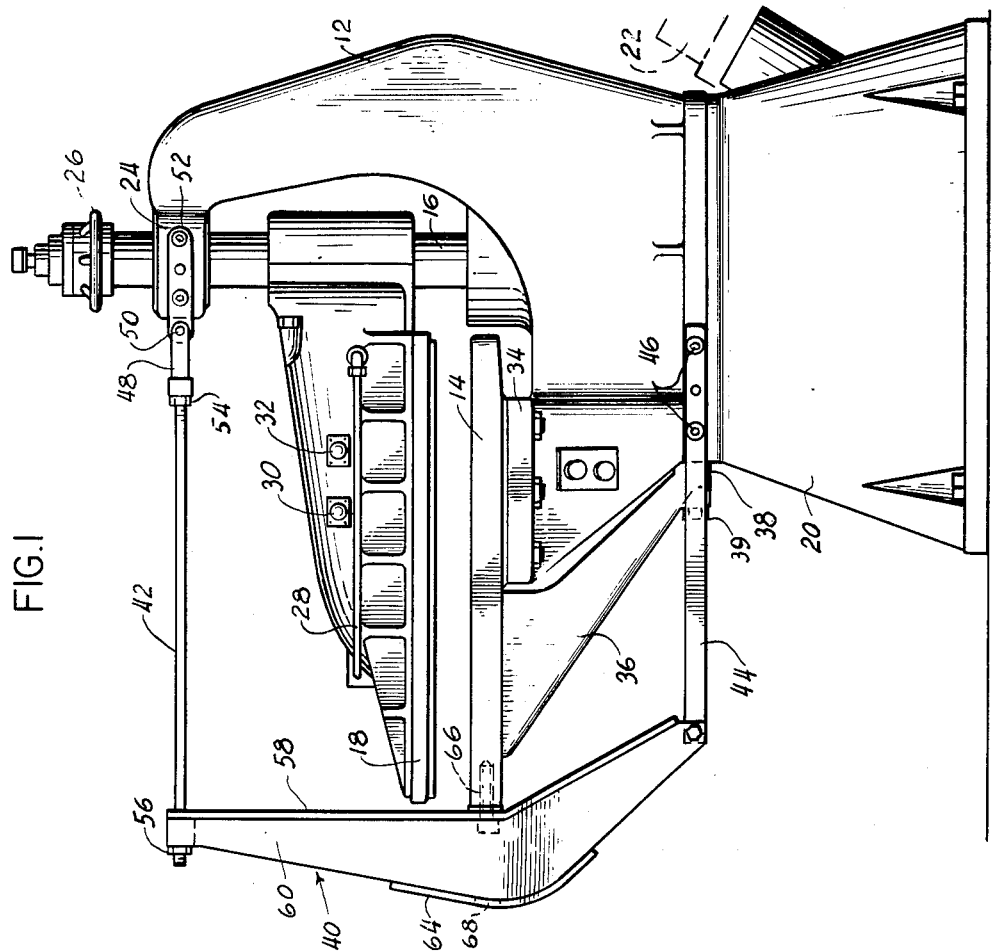
FIG. 1 is a side elevation of a die cutting machine embodying featuress of our invention.
Figure 2:
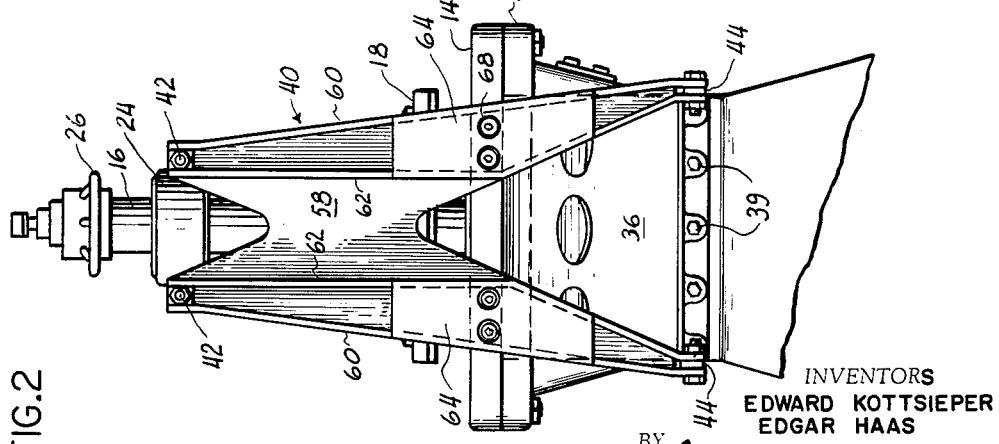
FIG. 2 is an end elevation thereof.

Referring to the drawing, and more particularly to FIGS. 1 and 2, the die cutting machine there shown comprises a C frame 12 including a table 14 for a flat cutting block or board, not shown. The cutting block may be made of wood, or of a composition material. There is also an upright cylindrical column or post 16 which carries a cutting arm 18 which is horizontally oscillatable toward or away from a position over the table 14. The post 16 is vertically reciprocable by mechanism therebelow, to give the arm 18 its cutting motion. In the present case the machine is hydraulically rather than mechanically operated, and the pedestal or base 20 acts as an oil tank. The oil is forced under pressure by a submerged pump, not shown, driven by a directly coupled electric drive motor 22 which is mounted on the outside of the base 20, as shown.

The upper end of C frame 12 has an upper main bearing 24 for supporting the post 16. The height of the cutting arm 18 may be adjusted by means of a hand wheel 26 at the top end of the post. This compensates for the height of the cutting block, the thickness of the material being cut, and the height of the die, none of which are shown in the drawing. The arm 16 is swung back and forth, as by means of hand rod 28, and the machine is tripped by simultaneously pressing two switch buttons 30 and 32, it being customary to use two in series in order to make sure that neither hand of the operator is still beneath the cutting arm.

The substantial lengthening of the table 14 will be clear from the drawing, in which it will be seen that the inner end of the table is securely bolted to a part 34 which is cast integrally with the C frame, while the outer end of the table is cast with a diagonal support 36 which bears against and is bolted to the lower part of the C frame at 38. With this construction the manufacturer may employ the same large casting 12 for machines of different table length, ranging say from thirty to forty inches, the change being accommodated by changing the accessory casting 14, 36. For purposes of the present description, the table casting 14, 36 is assumed to be a part of the C frame, as indeed it is in operation and for all practical effect. The cutting arm 18 is made or cast in different lengths, commensurate with the length of the table 14.

In accordance with the present invention, the C frame is reinforced against yielding under load. This is done by means of a rigid member 40 which bears against the end of table 14, and which extends both upward and downward therefrom. One or more tie bars 42 are connected between the upper end of the member 40 and the upper end of C frame 12. Also one or more tie bars 44 are connected between the lower end of the member 40 and the lower end of the C frame 12.

Considering the arrangement in greater detail, the upper end of member 40 preferably has a width commensurate with the upper end of the C frame 12, as is best shown in FIG. 2, and the lower end of the member 40 similarly has a width commensurate with the lower end of the C frame. There are two spaced collateral tie bars 42 at the top, and two spaced collateral tie bars 44 at the bottom. For purposes of adjustment, and in order to make it possible ot pre-load or pre-stress the brace members, two of the bars (in this case the upper bars 42) are preferably threaded rods which receive nuts. In such case the lower bars 44 may be rectangular in section, and may be bolted to the sides of the C frame, as shown at 46 in FIG. 1. In the construction here shown the rods 42 are received in links 48 connected at 50 to straps 52 which straps are bolted directly to the sides of the large main bearing 24. The rods 42 may be adjusted at the link 48, with the aid of lock nuts 54 to lock the adjustment, or may be adjusted by means of nuts 56 at the outer ends. Tension applied to rods 42 is also applied to bars 44 through the member 40.

The member 40 may be a cast member, but is here shown built up of welded steel plates. There is a main inner plate 58, the configuration of which will be seen in FIG. 2. This is stiffened by outer webs 60 and inner webs 62. The profile shape of these webs will be seen in FIG. 1. The member 40 is completed by means of two short and relatively narrow outer plates 64 which are welded across webs 60 and 62 at each side, at the midregion of member 40, that is, intermediate the upper and lower ends, or straddling the table 14. The webs extend lengthwise of member 40, and lie in planes generally parallel to the tie bars 42 and 44.

The member 40 is preferably secured to the end of table 14, as by means of four bolts 66 (FIG. 1). The outer plate 64 has four holes 68 through which the bolts 66 and a wrench may be inserted when securing the member 40 to the machine.

If the machine is to be subjected to even greater load, the cutting arm may be provided with diagonal struts. Such an arrangement is shown in FIGS. 3 and 4 of the drawing, in which C frame 112, table 114, column or post 116, cutting arm 118, base 120, motor 122, upper main bearing 124, and adjusting wheel 126 all correspond to the parts previously described, the reference numerals being increased by 100. However, in the present case the arm 118 is provided with a pair of stiffening struts 130 which extend diagonally from the outer portion of the arm at 132 to a thrust ring or collar 134 carried by the post 116 above the main bearing 124.

The struts 130 diverge somewhat in downward direction and are spaced well apart at their lower ends, which are spread at nearly the width of the arm 118. The struts act in compression, and may be pre-stressed by means of threaded inserts at either or both ends, the adjustment of which may be locked by means of lock nuts, as shown. If desired, the ends of the inserts may be given a ball shape, and may be received in mating sockets.

On consideration it will be evident that top tie bars running to the bearing 124, as shown in FIG. 1, would not be feasible in the machine of FIG. 3, because the tie bars would interfere with the travel of the diagonal struts 130 when the cutting arm 118 is moved away from the table 114 to shift the die after each operation.

In the present machine, therefore, the C frame 112 is extended upward as shown at 136, to a point higher than the ring 134. The rigid member 138 is correspondingly lengthened at its upper end, and the upper tie rods 140 extend from the upper end of member 138 to the upper end of the C frame extension 136.

The extension 136 is preferably cast integrally with the C frame, and at its upper end the frame preferably is widened as shown at 142 in FIG. 5, so that the tie rods 140 may be spaced apart to straddle and provide clearance for the post and its adjusting wheel. With the special cast shape here shown the rods 140 pass through the frame part 142, and the tension or pre-stress of the rods 140 (and bars 144) may be adjusted by means of nuts at either or both ends. In all cases extra nuts (not shown) may be added for strength and/or locking purposes.

The lower end of the member 138 is connected to the lower end of C frame 112 by tie bars 144, these being bolted to the sides of the C frame at 146.

The construction of the rigid member 138 is generally the same as previously described. The member may be cast, or may be assembled out of steel plates which are welded together. In the present case there is a main inner plate 158, stiffened by outer webs 160 and by inner webs 162. Smaller outside plates 164 are welded between the inner and outer webs in the region of the table 114. The member 138 is secured to the end of table 114 by four bolts 166 (FIG. 3), and the plates 164 have clearance holes 168 for the bolts 166.

The construction at the upper end of member 138 is shown in FIG. 6, in which the plate 158 and webs 160 and 162 are supplemented by a block 170 through which the tie rod 140 passes, and against which the nut or nuts 172 bears. There are two such blocks 170, one for each tie rod 140. The same construction is employed at the upper end of member 40 in FIGS. 1 and 2.

It is believed that the construction of our improved die cutting machine, as well as the advantages thereof, will be apparent from the foregoing detailed description. It will also be apparent that while we have shown and described the improvement in several preferred forms, changes may be made in the structures shown, without departing from the scope of the invention as sought to be defined in the following claims.

We claim:

1. A clicker type die cutting machine comprising a single C frame including a table for a cutting block, said table having an open end, an upright post carrying an arm which is horizontally oscillatable toward or away from a position over the table, said post being vertically reciprocable to give the arm its cutting motion, and means to reinforce the single C frame against yielding under load at the open end of the table, said means including a rigid brace member added to and bearing against the free end of the table and extending both upward and downward therefrom, one or more tie bars connected between the upper end of the brace member and the upper end of the C frame, and one or more tie bars connected between the lower end of the brace member and the lower end of the C frame, said brace member terminating above the floor and acting solely as a brace member.

2. A clicker type die cutting machine comprising a single C frame including a table for a cutting block, said table having an open end, an upright post carrying an arm which is horizontally oscillatable toward or away from a position over the table, said post being vertically reciprocable to give the arm its cutting motion, and means to reinforce the single C frame against yielding under load at the open end of the table, said means including a rigid brace member added to and bearing against the free end of the table and extending both upward and downward therefrom, a pair of spaced collateral tie bars connected between the upper end of the brace member and the upper end of the C frame, and a pair of spaced collateral tie bars connected between the lower end of the brace member and the lower end of the C frame, said brace member terminating above the floor and acting solely as a brace member.

3. A clicker type die cutting machine comprising a single C frame including a table for a cutting block, said table having an open end, an upright post carrying an arm which is horizontally oscillatable toward or away from a position over the table, said post being vertically reciprocable to give the arm its cutting motion, and means to reinforce the single C frame against yielding under load at the open end of the table, said means including a rigid brace member added to and bearing against the free end of the table and extending both upward and downward therefrom, the upper end of said brace member having a width commensurate with the upper end of the C frame and the lower end of said brace member having a width commensurate with the lower end of the C frame, a pair of spaced collateral tie bars connected between the upper end of the brace member and the upper end of the C frame, and a pair of spaced collateral tie bars connected between the lower end of the brace member and the lower end of the C frame, said brace member terminating above the floor and acting solely as a brace member.

4. A clicker type die cutting machine as defined in claim 1, in which the upper end of the C frame has a bearing receiving the post, and in which the upper tie bar extends to the said main bearing.

5. A clicker type die cutting machine as defined in claim 2, in which the upper end of the C frame has a main bearing receiving the post, and in which the upper tie bars extend to the sides of the said main bearing.

6. A clicker type die cutting machine as defined in claim 3, in which the upper end of the C frame has a main bearing receiving the post, and in which the upper tie bars extend to the sides of the said main bearing.

7. A clicker type die cutting machine as defined in claim 1, in which there are stiffening struts extending diagonally from the arm to a ring on the post, and in which the C frame has a main bearing receiving the post above the arm and below the ring, and in which the C frame is extended upward to a point higher than the ring, and in which the upper tie bar extends from the upper end of the member to the upward extension of the C frame above said ring.

8. A clicker type die cutting machine as defined in claim 2, in which there are stiffening struts extending diagonally from the arm to a ring on the post, and in which the C frame has a main bearing receiving the post above the arm and below the ring, and in which the C frame is extended upward to a point higher than said main bearing, and in which the upper tie bars extend from the upper end of the member to the upward extension of the C frame above said main bearing.

9. A clicker type die cutting machine as defined in claim 3, in which there are stiffening struts extending diagonally from the arm to a ring on the post, and in which the C frame has a main bearing receiving the post above the arm and below the ring, and in which the C frame is extended upward to a point higher than said ring, and in which the upper tie bars extend from the upper end of the member to the upward extension of the C frame above said ring.

10. A clicker type die cutting machine as defined in claim 2, in which said rigid member is sturdily webbed by a plurality of webs extending lengthwise of the member and lying in planes generally parallel to the tie bars.

11. A clicker type die cutting machine comprising a C frame including a table for a cutting block, an upright post carrying an arm which is horizontally oscillatable toward or away from a position over the table, said post being vertically reciprocable to give the arm its cutting motion, and means to reinforce the C frame against yielding under load, said means including a rigid member bearing against the end of the table and extending both upward and downward therefrom, one or more tie bars connected between the upper end of the member and the upper end of the C frame, and one or more tie bars connected between the lower end of the member and the lower end of the C frame, stiffening struts extending diagonally from the arm to a ring on the post, said C frame having a main bearing receiving the post above the arm and below the ring, and said C frame being extended upward to a point higher than the ring, the aforesaid upper tie bar extending from the upper end of the member to the upward extension of the C frame above said ring.

12. A clicker type die cutting machine comprising a C frame including a table for a cutting block, an upright post carrying an arm which is horizontally oscillatable toward or away from a position over the table, said post being vertically reciprocable to give the arm its cutting motion, and means to reinforce the C frame against yielding under load, said means including a rigid member bearing against the end of the table and extending both upward and downward therefrom, a pair of spaced collateral tie bars connected between the upper end of the member and the upper end of the C frame, and a pair of spaced collateral tie bars connected between the lower end of the member and the lower end of the C frame, stiffening struts extending diagonally from the arm to a ring on the post, said C frame having a main bearing receiving the post above the arm and below the ring, and said C frame being extended upward to a point higher than said main bearing, the aforesaid upper tie bars extending from the upper end of the member to the upward extension of the C frame above said main bearing.

13. A clicker type die cutting machine comprising a C frame including a table for a cutting block, an upright post carrying an arm which is horizontally oscillatable toward or away from a position over the table, said post being vertically reciprocable to give the arm its cutting motion, and means to reinforce the C frame against yielding under load, said means including a rigid member bearing against the end of the table and extending both upward and downward therefrom, the upper end of the C frame and the lower end of said member having a width commensurate with the lower end of the C frame, a pair of spaced collateral tie bars connected between the upper end of the member and the upper end of the C frame, a pair of spaced collateral tie bars connected between the lower end of the member and the lower end of the C frame, stiffening struts extending diagonally from the arm to a ring on the post, said C frame having a main bearing receiving the post above the arm and below the ring, and said C frame being extended upward to a point higher than said ring, the aforesaid upper tie bars extending from the upper end of the member to the upward extension of the C frame above said ring.

References Cited by the Examiner

UNITED STATES PATENTS

| 1,431,920 | 10/1922 | Ballard | 83—534 |
| 1,500,101 | 7/1924 | Ballard | 83—539 X |
| 1,902,054 | 3/1933 | Ballard et al. | 83—536 |
| 2,161,257 | 6/1939 | Keall | 83—540 |

FOREIGN PATENTS 503,329   4/1939   Great Britain.

WILLIAM W. DYER, JR., *Primary Examiner.*

F. T. YOST, *Assistant Examiner.*